Patented Sept. 25, 1945

2,385,527

UNITED STATES PATENT OFFICE 2,385,527

METHOD OF DECOLORIZING SULPHUR

Arthur B. Menefee, Cumberstone, Md., and Herbert H. Greger, Washington, D. C.

No Drawing. Application March 21, 1941, Serial No. 384,508

19 Claims. (Cl. 23—293)

This invention relates to the treatment of sulphur, more particularly to an improved method of decolorizing sulphur.

The present invention invokes the fundamental principles of the separation of liquid phase sulphur from an agglomerated or nodulated solid phase material as is more particularly described in copending applications Serial Nos. 382,844 and 382,845, filed March 11, 1941.

It is known that very small amounts of organic matter may disadvantageously affect the color of sulphur. Such organic matter, which is naturally occurring with sulphur in sulphur ores and in sulphur deposits, tend to react with sulphur to form complexes, sometimes known as "sulphur dyes" of high tinctorial value. The effect of these is so great that in treating sulphur ores or concentrates containing as low as .02% organics the reaction products of these organics reduces the color below that known in the trade as "bright sulphur" and militates strongly against the value of the product.

The effect of minor amounts of organics in darkening sulphur is well known and many suggestions have been made to decolorize the sulphur so discolored. Such prior suggestions for decolorization involve the use of aluminum chloride, preferential adsorbents, or distillation of the mass so as to recover a pure sulphur as an overhead condensed fraction. With the exception of the distillation method all of such prior decolorizing treatments necessitate the use of a subsequent filtration step. This step is costly in that among other things it reduces the yield. The distillation method inherently is expensive.

As has been explained fully in the copending applications above referred to, it has been discovered that naturally occurring sulphur associated with inorganic gangue material may be separated by an unique method. This method involves essentially the heating of the ore, or a concentrate of the ore, in contact with a wetting agent which functions preferentially to wet the gangue particles and to agglomerate these into larger masses. When a properly chosen reagent is utilized and employed in an adequate ratio to the gangue and the mass is agitated under the proper conditions it is possible to respectively cohere the wetted agglomerate particles and to build these up into nodulated or spheroidal units of high mechanical strength and surprising uniformity of size. When the conditions are properly controlled, as fully explained in the cross-referenced application, Serial No. 382,845, the molten sulphur not only flows freely from the agglomerated gangue but the gangue agglomerates themselves serve as a peculiarly effective filtering medium such that the agglomerated gangue phase acts as a filter bed of a continuously renewing type which filters outdispersed smaller gangue particles.

As a result of considerable research on this subject, it has been ascertained that sulphuric acid serves excellently as an agglomerating reagent. It has been further found that sulphuric acid, in high concentration, subserves the additional function of decolorizing sulphur. While the invention, of course, is not limited to any mechanism of the reaction involved, it appears that sulphuric acid in high concentration dissolves the organic impurities and/or inhibits their reaction with the sulphur. It has been determined, for example, that sulphuric acid of 93% concentration has a material effect in decolorizing sulphur which is naturally associated with organics. It has been further found that strong acid, namely 98% sulphuric acid, has a striking effect in decolorizing such sulphur.

As explained in the prior application, in order to effectively agglomerate the gangue particles so as to render them readily removable from a molten sulphur phase it is essential positively to insure a wetting of the particles by the reagent. When sulphuric acid in moderate strengths, as for example from 60% acid to 90% acid, more or less, is employed for agglomeration, it is necessary to insure the addition of this prior to dehydration of the sulphur-gangue mass. However, it has been found that 98% sulphuric acid has an unexpected, if not critical, effect in this relation. Ninety-eight per cent sulphuric acid possesses the capability of displacing a film of sulphur which has wetted a gangue particle. This double effect of the strong sulphuric acid, namely its ability to agglomerate gangue and to decolorize the molten sulphur phase is of especial benefit and peculiar importance herein and these functions are utilized for the purpose of decolorizing sulphur.

The process of the present invention is based on a discovery that when off-colored sulphur, in molten condition, is agitated with proper amounts of concentrated sulphuric acid, it preferentially wets the inorganic particles. When the molten sulphur-acid wetted gangue system, in the proper ratio of gangue to acid, is subjected to the proper type of agitation, it is possible to collect the gangue particles into dense, strong, individual spheroidal units of a surprisingly uniform size which absorb or otherwise carry the organics and remove them from the molten sulphur phase.

The special character of the agglomerated masses is such that they serve very effectively as a filtering medium for the liquid sulphur. These agglomerates are of sufficiently high mechanical strength to withstand impact and breakdown incident to transportation and handling on a filter screen. As pointed out in the prior applications referred to these agglomerates have a specific beneficial effect when employed as a filter medium. By filtering the molten sulphur through these agglomerates, clarified sulphur of an especially high purity is obtained. It is thus possible, with this method, to recover sulphur with an ash content of below .05% and in some cases as low as .0003%. The percentage of ash in the recovered sulphur is, to a considerable extent, a function of the size of the agglomerates. For example, the lower ash content mentioned above, i. e., of the order of .0003% is obtainable by controlling the gangue-acid ratio and agitation so as to secure substantially uniformly sized spheroids of between 1/32 and 1/16 inch and by utilizing these as a filter bed of at least six inches in depth. The rationale of this highly effective filtration appears to be the establishment of sufficiently small openings or interstitial space between contiguous agglomerates so as to mechanically catch or entrain the fine gangue particles in or on the acid wetted surfaces. Producing agglomerates of this size and filtering the molten sulphur phase through such agglomerates enables production of purified sulphur at a filtering rate of above ten tons of sulphur per square foot of filter area per day. This filtering rate can be markedly increased while still securing a clarified sulphur of low ash content by increasing the average agglomerate size up to approximately 1/8 inch. In this type of bed the interstitial spaces are of greater magnitude and the bed does not filter out the ultra-fine particles which are entrapped in a filter bed made up of smaller spheroids. In this latter case, however, sulphur containing less than .05% ash may be produced at a more rapid filtering rate.

As noted above, the filtering bed is, in a sense, self-renewing due to the improved mechanical properties of the agglomerates established by the proper gangue to acid ratio and the optimum type of agitation. In batch or continuous filtering, the agglomerates which are deposited are strong enough to resist material break-down and thus prevent the establishment of dense surface layers of fines which would clog the bed. In discharging a molten sulphur-agglomerated gangue system onto a retaining screen, therefore, the filter bed is continuously built up or renewed by successive depositions of agglomerates and the establishment of a stratified layer of fines or slime is precluded.

The method of practically invoking these factors so as economically to produce a purified sulphur from discolored sulphur will be more readily appreciated from a consideration of typical processes in which these principles are utilized.

As has been carefully explained in the copending application 382,845, agglomeration of a gangue in a molten sulphur-gangue system may be effected by properly proportioning the quantity of acid to the type, quantity and fineness of the gangue. It will be appreciated that since the present operation involves purification of sulphur itself it is desirable to operate with as low gangue concentrations as is consonant with good results. It has been found as a general rule that in the agglomeration of gangue in a molten sulphur phase, the agglomerated material after draining and removing the acid contains about 30% sulphur. The operation should, therefore, be adjusted so as to reduce such sulphur losses. For this reason in decolorizing operations a practical minimum of any given collector or absorber should be used and the quantity of acid should be adjusted to this. The quantity of acid employed will, as is more carefully explained hereinafter, very considerably depending upon the chemical and physical character of the collector. As a general rule the gangue to acid ratio may be from .32 to 1 to 2.5 to 1 or more. The gangue concentration will, of course, vary with the type of gangue or absorbent and in practical limits may extend from about .5% to 3% or more. The acid concentration similarly may vary from about 1.25% or less to 4.5% or more depending upon the particular collecting agent used.

A second factor of prime importance in the novel process, as fully explained in our copending application, is the fineness of the inorganic collection material. Since an essential prelude to agglomeration is effective wetting of the particles of the inorganic material by the acid, it follows that increase in the surface area, i. e., greater fineness of the solids, necessitates a commensurate increase in the quantity of the reagent. The quantitative relationship between the particle size of the collecting agent and the amount of acid can readily be determined for any particular collecting or absorbing agent in accordance with the principles outlined in the copending application and as indicated hereinafter.

As will be seen subsequently the process is operative with a number of specifically different types of collecting or absorbing agents, such as crude sulphur ore, siliceous gangue, quartz, volcanic ash, anthracite coal and the like. The effectiveness of these materials and their utilization in the new method will be appreciated from a consideration of typical examples. The choice of the collecting material will largely depend upon local conditions, such as availability, transportation and the like. If the process is to be operated in conjunction with the recovery of sulphur from crude ore the inorganic collector may comprise ground crude ore, flotation concentrates, flotation tailings and the like. Where possible these materials should be comparatively free from organic matter and relatively dry. Another material which may effectively be employed is the agglomerates recovered from the filter bed. These may be washed with water to remove adherent acid and roasted to drive off the contained sulphur as a gas for any desired utilization. The finely divided dry roasted agglomerate material serves excellently as a collector absorbent. Other collectors which are eminently satisfactory are diatomaceous earth, partially or wholly calcined gypsum, volcanic ash, finely ground barium sulphate, finely ground quartz and kaolinite. In the use of any particular one of these collectors, as noted hereinbefore, the amount of inorganic employed should be such as to give optimum fluidity in the molten sulphur-collector system coupled with efficient agglomeration. This latter, as will be appreciated, is in turn predetermined by the proper acid to collector ratio and proper agitation. In the utilization of certain of these collectors additional compensations in the collector to acid ratio may be necessitated by the special physical structure or chemical character of the collector or absorbent. For example, if the collecting material is cellular or pumiceous, i. e., presents considerable inside surface area, an increased amount of acid will be required. If the material contains a base which will react with the acid to form a sulphate the quantity of acid must be increased to satisfy such reaction and to provide an adequate amount for proper agglomeration. It is evident, if a silicate such as clay, feldspar and the like, be used, the bases in such collectors will be reacted on by the acid, forming sulphates, leaving the equivalent of silica gel, an excellent adsorbent, as an end product.

In a typical operation utilizing for example a roasted siliceous gangue, produced from agglomerates in accordance with copending application Serial No. 382,845, filed March 11, 1941, may be admitted to a conditioning tank together with the sulphur to be decolorized in the proper ratio of gangue to sulphur. This material may be heated by suitable heating means, as for example in the apparatus described in our copending application, to produce a molten mass. To the molten mass may then be added 98% sulphuric acid in an amount sufficient to form agglomerates of the desired size. The molten sulphur and reagent may then be agitated, preferably with a mixer operating at approximately 400 R. P. M. for a period of 15 minutes to one hour more or less. In these circumstances the gangue collects into uniformly sized spheroids of the order of 1/8 inch in diameter. The size of the spheroids may be controlled, as explained in the prior application by adjustment of the acid to gangue ratio.

After the material has been properly agglomerated it may be run into a filtering container of the type described in the copending application from which a decolorized sulphur may be recovered as a filtrate. The gangue, collecting on the filter screen may, as noted above, be washed with water, roasted and re-employed as a collector in the process. The efficacy of the process will be the more readily appreciated from a consideration of typical specific examples.

*Example I*

Six hundred pounds of a partially purified sulphur and 10 pounds of reclaimed gangue were heated in a conditioning tank so as to produce a molten mass. The mass in the conditioning tank was agitated with a 400 R. P. M. mixer. Six pounds of 98% sulphuric acid was added and the amount gradually increased to 7½ pounds. It required about one hour and twenty minutes, with gradual addition of acid, to form agglomerates of 1/8 inch plus. These agglomerates were quite firm. The material in the conditioning tank was filtered through a filter bed composed of 2½ inches of ¼ inch pebbles and one inch of 20 mesh sand. This mix was retained on a 1/8 inch mesh screen with an area of approximately ½ square foot. The total mass was filtered in eighteen minutes and therefore passed through it at a rate 33.2 pounds per minute, i. e., 67 pounds per minute per square foot of screen area. The sulphur produced was of a vivid canary yellow. In this test, it will be noted, the gangue to acid ratio was 1.32 to 1, the gangue concentration was 1.66% and the acid concentration 1.25%.

*Example II*

Seven hundred and fifty pounds of partially purified sulphur was melted in a conditioning tank with 12½ pounds of gangue. This gangue was similar to that employed in Example I, but was not as fully burned. To the molten mass was added 7¾ pounds of 98% sulphuric acid and this amount was increased up to a total of 10 pounds. During this period the mass was continuously agitated but suitable sized agglomerates for self-filtering were not produced. Thereafter 7½ pounds of gangue was added making a total of 20 pounds of gangue. Upon the addition of four additional pounds of acid and with a short period of agitation 1/8 inch agglomerates of firm character were produced. This sulphur filtered readily and was of an excellent color. In this example the gangue to acid ratio was 1.43 to 1, the gangue concentration was 2.65% and the acid concentration 1.84%.

As noted above, the process is operable with different types of collectors as indicated by the following example.

*Example III*

Seven hundred and fifty pounds of partially purified sulphur and 10 pounds of diatomaceous earth (hyflow) containing 6 pounds of 98% sulphuric acid was melted and agitated in a conditioning tank. Additional acid was added until 1/8 inch agglomerates were formed. It required 27½ pounds of additional acid and about two hours conditioning time to produce the desired agglomerates. The decolorized sulphur produced filtered readily at the rate of about 60 pounds per minute, per square foot of screen. The gangue to acid ratio here employed was .315 to 1, the gangue concentration was 1.32 and the acid concentration 4.45. This example indicates the increased acid requirements of highly absorptive material such as diatomaceous earth as compared to reclaimed gangue.

It will be understood that in carrying out the process the collecting material need not necessarily be of one particular type but the agglomeration may be effected with a mixture of collectors. Such a type of operation is shown in the following example:

*Example IV*

Seven hundred and fifty pounds of partially purified sulphur was melted with 12½ pounds of a partially burnt gangue. Seven and three-fourths pounds of 98% sulphuric acid was added and this amount was increased to 11 pounds before 1/8 inch size agglomerates were formed. The molten sulphur at this stage was not fully clarified and three additional pounds of acid were required to produce a satisfactory color. After this addition the agglomerates were 1/8 inch in size but rather soft. However, the addition of two pounds of minus 200 mesh quartz increased the firmness of the agglomerates and rendered them suitable for filtering. In this operation the gangue to acid ratio was approximately 1 to 1, the gangue concentration 1.92% and the acid concentration 1.88%.

The following example illustrates the utility of quartz as a collecting agent in the improved method:

*Example V*

A mixture of 7½ pounds of minus 200 mesh quartz was added to 492.5 pounds of partially purified sulphur. The melt was agitated in the conditioning tank until substantially all moisture was removed. To the melt 6 pounds of 98% sulphuric acid was added. After an agitation period of one hour no agglomerates of any appreciable size had formed. Thereafter additional quartz was added bringing the total up to 12 pounds. At this stage agglomerates of 1/16 inch were formed but these were relatively soft. Continued agitation and the addition of one more pound of quartz increased the size to 3/32 inch. The agglomerates at this stage were still soft but upon the addition of an additional pound of quartz the size increased to 1/8 inch and the agglomerates were firm. The sulphur produced readily filtered through a filter bed of sand and pebbles retained on an 8 mesh screen. In this operation the gangue to acid ratio was 2.33 to 1 illustrating the effect of the increased area of the finer material.

As noted previously other materials, such as volcanic ash are likewise effective for carrying out the invention as shown in the following example:

Example VI

Seven hundred and fifty pounds of partially purified sulphur and 10 pounds of volcanic ash were melted in a conditioning tank until substantially all the moisture was driven out. While the material was agitated in the tank 7½ pounds of 98% sulphuric acid was added. In about 10 minutes very small agglomerates had formed. Additional volcanic ash was added bringing the total up to 23 pounds at which time the agglomerates were about 1/32 inch. It appeared at this time that acid was being consumed by reaction with the feldspar contained in the volcanic ash. Upon the addition of 12½ pounds more of sulphuric acid the agglomerates were increased in size up to 1/8 inch. This material filtered readily producing a sulphur of excellent color. In this operation the ratio of ash to acid was 1.15 to 1 indicating as noted, a consumption of acid in the chemical reaction.

The broad range of materials available for employment as collectors or absorbents in the process is further illustrated by the following example which shows the utility of powdered coal for this purpose:

Example VII

A charge comprised of 95 pounds of a purified sulphur of fair color and 5 pounds of Freeport brown sulphur was made up. This combined charge analyzed more than 0.03% carbon. The charge was melted in a steam jacketed kettle, 3 pounds of pulverized anthracite coal was added and the mass agitated with a ¼ H. P. 1725 R. P. M. mixer. The mix was heated and agitated until substantially all the moisture was expelled. At this stage, when the agitator was stopped, the powdered coal rose to the surface indicating that the coal was not substantially wetted by the molten sulphur. This agitation was continued and 98% sulphuric acid was added in stages up to 3.25 pounds. After the last addition of acid it required about 15 minutes agitation to agglomerate the coal sufficiently to collect the fine particles. The agglomerates thus formed were of the order of 1/16 in diameter and were somewhat soft. The sulphur filtered readily from the agglomerates and was of an excellent color. The filtered sulphur analyzed less than 0.015% carbon.

It will be appreciated that in some circumstances it may be desirable to employ a relatively reactive collector so as to form reaction products in situ which have a beneficial function in the process. For example inorganic silicates (e. g., kaolinite, feldspars, crysotile asbestos, etc.) may be utilized. In these circumstances, by proper adjustment of the quantity of acid, agglomeration may be effected with formation of an adsorbent such as silica gel, by reaction of the base in the silicate with the acid. Such adsorbents function to improve the decolorization of the sulphur.

From a consideration of the preceding examples it will be seen that there is a relatively wide range of materials which are available for the decolorizing of sulphur. The conditions of a particular operation, as is clearly indicated, will depend to a large extent upon the type and character of the collecting agent employed. As will have been seen from the examples, the ratio of collecting agent to acid depends upon the character of the collector, i. e., its fineness, adsorptive or absorptive capacity, chemical reactivity and the like. As a general rule, where opalescent silica gangue which has been reclaimed from residues is employed a ratio of 1.34 of gangue to 1 of 98% sulphuric acid is very effective. In the case of highly absorptive materials, such as diatomaceous earth, considerably more acid must be employed. In this case, the average ratio is of the order of .346 of the collector to 1 of the acid. In the case of volcanic ash the approximate ratio is about 1.15 of the ash to 1 of acid. In the case of quartz the approximate ratio is about 2.33 of the quartz to 1 of acid.

It will be observed similarly that the actual acid concentration and the gangue concentration employed in any given operation may vary considerably. Thus the gangue concentration may range from approximately .55% to 2½% or more. The acid concentration may vary from the order of 1.25% to 4% or more. Utilizing the fundamental principles as explained herein the proper conditions for any given type of collector may readily be determined.

It is apparent, of course, that the present invention may be utilized for the treatment of off-colored sulphur from whatever source such sulphur is derived. While in the particular examples cited the sulphur which was treated was produced by the agglomeration method using weak acid the charge may comprise discolored sulphur produced from sulphur ores by any method, by-product sulphur, Louisana and Texas sulphur and the like.

While certain specific collecting agents have been mentioned it will be understood that the described group is not exhaustive. The process is operable with many types of material whether substantially nonreactive or reactive to molten sulphur and the reagent employed, which can be preferentially wetted by the reagent and agglomerated into units of the desired size. The described materials and similarly functioning or equivalent materials are generically defined herein as collectors.

It will now be appreciated that the present invention presents an extremely simple and effective method of decolorizing sulphur. This method in essence involves a single stage operation, that is to say the agglomeration of collecting materials in a molten sulphur phase in contact with an agglomerating and decolorizing agent such that the collecting material is transformed into such physical condition that it may readily be separated from the molten sulphur by simple filtration. Such filtration may be carried out in an open container and with the utilization of but a retaining screen of suitable mesh. This process, as compared with earlier suggestions in the art, is eminently economical providing for exceptionally high filtering rates and hence maximum through-put of sulphur with minimum apparatus requirements while insuring a high recovery of decolorized sulphur.

While a preferred embodiment of the invention has been described it is to be understood that this is given to exemplify the underlying principles involved and not as limiting the effective scope to the particular examples cited.

We claim:

1. The method of decolorizing sulphur discolored with organic matter which comprises contacting the discolored sulphur, in molten condition, with an added finely divided solid material adding concentrated sulphuric acid of between about 93% and 98%, agitating for a period of time sufficient to agglomerate the material into larger nodular unit masses and to remove discolorizing agents from the molten sulphur and then separating the molten sulphur from the acid wetted material.

2. That method of decolorizing sulphur discolored with organic matter which comprises agitating the discolored sulphur in molten condition with a selected added amount of a finely divided solid absorbent and concentrated sulphuric acid of between 93% and 98% agitating for a period of time sufficient to remove discolorizing agents from the molten sulphur, and to agglomerate the absorbent into readily separable inert nodular masses and separating a clarified sulphur from the agglomerated acid-wetted masses.

3. A method of decolorizing sulphur which is discolored with organic material which comprises contacting discolored sulphur, in molten condition, with a selected added amount of a finely divided absorbing agent which does not react with sulphuric acid and in the presence of concentrated sulphuric acid of between about 93% and 98%, agitating the mass for a period of time sufficient to effect the formation of relatively large substantially rigid agglomerates of the absorbing agent of predetermined size and draining the clarified molten sulphur from the formed agglomerates.

4. A method of decolorizing sulphur which is discolored with organic matter which comprises contacting discolored sulphur, in molten condition, with an added finely divided solid absorbing agent which does not react with sulphuric acid adding concentrated sulphuric acid of between about 93% and 98% to the molten mass; agitating the mass for a period of time sufficient to effect the formation of nodular firm agglomerates of the absorbing agent and separating the molten decolorized sulphur from the agglomerated absorbent.

5. The method of decolorizing off-colored sulphur which is discolored with organic matter which comprises agitating the sulphur in liquid phase with 98% sulphuric acid and in the presence of a selected added amount of a finely divided solid agglomeration absorbent which is preferentially wetted by the acid and which collector is agglomerated into large firm nodular masses under the action of agitation.

6. The method of decolorizing off-colored sulphur which is discolored with organic material which comprises agitating the sulphur in liquid phase with substantially 98% sulphuric acid and in the presence of a selected added amount of a finely divided solid absorbent material which does not react with sulphuric acid and which is preferentially wetted by the acid, agglomerating the absorbent material into larger unit masses and separating such masses from a clarified molten sulphur.

7. The method of decolorizing off-colored sulphur which is discolored with organic material which comprises agitating the sulphur in liquid phase with substantially 98% sulphuric acid and in the presence of a selected added amount of a finely divided solid absorbent material which is substantially non-reactive to molten sulphur, is preferentially wetted by the acid and capable of being agglomerated into larger unit masses in the presence of molten sulphur; continuing the agitation to consolidate the absorbent material into larger self-sustaining unit masses which collect as a supernatant phase and separating such solid phase agglomerated material from the molten sulphur.

8. A process in accordance with claim 7 in which the final separation is effected by filtration.

9. A process in accordance with claim 7 in which the final separation is effected by filtering the molten sulphur through a filtering bed comprised of the said agglomerated masses.

10. A process in accordance with claim 7 in which the final separation is effected by filtering the molten sulphur through a filtering bed consisting of such agglomerated masses in spheroidal form of a diameter of between $\frac{1}{16}$ and $\frac{1}{8}$ inch.

11. A method of decolorizing sulphur discolored with organic material which comprises contacting the sulphur in molten condition with 98% sulphuric acid in the presence of a selected added amount of a finely divided solid absorbent material which does not react with sulphuric acid or molten sulphur and which is preferentially wetted by the acid, agitating the mass under conditions which conduce to the formation of spheroidal agglomerates of the absorbent material of between $\frac{1}{64}$ and $\frac{1}{16}$ inch in diameter, discharging the mass on to a retaining screen and flowing the molten sulphur through a bed of the said agglomerates.

12. The method of decolorizing off-colored sulphur which is discolored with organic material which comprises contacting the sulphur, in liquid phase, with substantially 98% sulphuric acid, in an amount between substantially 1.25% to 4% of the sulphur treated and in the presence of a selected added amount of a finely divided solid absorbent material which is substantially non-reactive to molten sulphur, and which is preferentially wetted by the acid and capable of being agglomerated into larger unit masses in the presence of molten sulphur; vigorously agitating the mass for a period of time sufficient to agglomerate the absorbent material into larger self-sustaining unit masses and separating such solid phase agglomerated material from the molten sulphur.

13. A process in accordance with claim 19 in which the final separation is effected by filtration.

14. A process in accordance with claim 19 in which the final separation is effected by filtering the molten sulphur through a filtering bed comprised of said agglomerated masses.

15. A process in accordance with claim 19 in which the final separation is effected by filtering the molten sulphur through a filtering bed consisting of such agglomerated masses in spheroidal form of a diameter between $\frac{1}{16}$ and $\frac{1}{8}$ inch.

16. A process in accordance with claim 19 in which such absorbent material is chosen from the group consisting of siliceous gangue, volcanic ash, diatomaceous earth, quartz, partially or wholly calcined gypsum, barium sulphate, anthracite coal, kaolinite, silica gel and activated clay.

17. The method of decolorizing sulphur which is discolored with organic material which comprises agitating molten sulphur with a selected added amount of finely divided particles of solid material in the presence of a predetermined amount of 98% sulphuric acid which finely divided particles are adapted preferentially to extract organic coloring material from the sulphur and which particles under the action of agitation cohere into larger agglomerated self-sustaining unit masses and separating the decolorized sulphur from the said unit masses.

18. The method of decolorizing sulphur which is substantially pure but which is discolored with minor amounts of organic matter, which comprises adding a finely divided solid absorbing material to the sulphur in the proportion of approximately .55% and 2.5% of the absorbent material on the basis of the sulphur, such material being non-reactive to sulphur and being preferentially wetted by sulphuric acid, liquifying the sulphur in the presence of substantially 98% sulphuric acid, vigorously agitating the molten mass for a period of time sufficient to effect the consolidation of the wetted absorbent material into larger self-sustaining unit masses, and separating such unit masses from the decolorized molten sulphur.

19. The method of decolorizing sulphur which is discolored with minor amounts of organic matter which comprises adding a finely divided solid absorbent material to the sulphur in the proportions of approximately .55% and 2.5% of the absorbent on the basis of the sulphur, such material being non-reactive to sulphur and being preferentially wetted by sulphuric acid, liquifying the sulphur in the presence of between about 1% and 4% of substantially 98% sulphuric acid, vigorously agitating the molten mass for a period of time sufficient to effect the consolidation of the wetted absorbent material into larger self-sustaining unit masses, and separating such unit masses from the decolorized molten sulphur.

ARTHUR B. MENEFEE.
HERBERT H. GREGER.